United States Patent
Holveck

(10) Patent No.: US 9,509,240 B2
(45) Date of Patent: Nov. 29, 2016

(54) ELECTRIC MOTOR USING MULTIPLE REFERENCE FRAMES FOR FLUX ANGLE

(71) Applicant: Tesla Motors, Inc., Palo Alto, CA (US)

(72) Inventor: Mark Holveck, Palo Alto, CA (US)

(73) Assignee: TESLA MOTORS, INC., Palo Alto, CA (US)

( * ) Notice: Subject to any disclaimer, the term of this patent is extended or adjusted under 35 U.S.C. 154(b) by 125 days.

(21) Appl. No.: 14/609,242

(22) Filed: Jan. 29, 2015

(65) Prior Publication Data

US 2016/0190961 A1 Jun. 30, 2016

Related U.S. Application Data

(60) Provisional application No. 62/098,312, filed on Dec. 30, 2014.

(51) Int. Cl.
*H02P 6/16* (2016.01)
*H02P 6/18* (2016.01)
*H02P 21/14* (2016.01)

(52) U.S. Cl.
CPC ............. *H02P 6/181* (2013.01); *H02P 21/141* (2013.01)

(58) Field of Classification Search
USPC ............................... 318/400.07, 400.15, 701
See application file for complete search history.

(56) References Cited

U.S. PATENT DOCUMENTS

| | | | | |
|---|---|---|---|---|
| 6,014,006 A | * | 1/2000 | Stuntz | H02P 21/13 318/799 |
| 7,739,005 B1 | | 6/2010 | Tang | |
| 7,847,501 B2 | | 12/2010 | Baglino et al. | |
| 7,960,928 B2 | * | 6/2011 | Tang | B60L 15/025 318/400.02 |
| 2008/0228416 A1 | * | 9/2008 | Arnet | H02P 21/16 702/65 |
| 2009/0256517 A1 | * | 10/2009 | Baglino | B60L 15/025 318/772 |
| 2014/0354196 A1 | * | 12/2014 | Ahmad | H02P 25/08 318/254.1 |

OTHER PUBLICATIONS

Hofmann, Heath, et al., "Stator-Flux-Based Vector Control of Induction Machines in Magnetic Saturation", IEEE, 1995, pp. 152-158.

* cited by examiner

*Primary Examiner* — Jorge L Carrasquillo
(74) *Attorney, Agent, or Firm* — Garlick & Markison; Bruce E. Garlick

(57) ABSTRACT

A drive unit includes: an electric motor; a flux estimator circuit configured to estimate at least a flux angle; a synchronous frame generator coupled to a rotor of the AC induction motor and configured to detect a rotor mechanical angle; and a switch configured to selectively provide either the flux angle or the rotor mechanical angle for controlling the motor.

18 Claims, 3 Drawing Sheets

ELECTRIC MOTOR USING MULTIPLE REFERENCE FRAMES FOR FLUX ANGLE

This patent application claims the benefit of the filing date of U.S. provisional patent application 62/098,312, filed Dec. 30, 2014 and entitled "Torque Sleep Dual Electric Motors," the entire contents of which are hereby incorporated herein by reference.

BACKGROUND

Electric motors are used as drive units in a variety of contexts. For example, electric vehicles have one or more electric motors that are powered by an onboard energy storage, such as a battery pack. The available range for the vehicle depends on a variety of factors, such as the capacity of the battery pack and the efficiency of the electric motor(s), as well as external conditions (wind, terrain) and the style of driving. To increase the utility of the vehicle and give the driver more flexibility, it is desirable to increase the range of vehicles, for example by implementing energy-saving measures.

SUMMARY

In a first aspect, a drive unit includes: an electric motor; a flux estimator configured to estimate at least a flux angle; a synchronous frame generator coupled to a rotor of the electric motor and configured to detect a rotor mechanical angle; and a switch configured to selectively provide either the flux angle or the rotor mechanical angle for controlling the electric motor.

Implementations can include any or all of the following features. The drive unit further comprises a motor controller that uses a torque request for the electric motor, and a q current regulator, wherein the switch is configured to provide, based on the torque request being zero and a q current being below a threshold, the rotor mechanical angle for controlling the electric motor. The drive unit further comprises a d current regulator, wherein a d current reference for the d current regulator is set to zero based on switching to the rotor mechanical angle for controlling the electric motor. The drive unit further comprises a flux regulator linked to the d current regulator, wherein the flux regulator is delinked from the d current regulator based on switching to the rotor mechanical angle for controlling the electric motor. The flux estimator circuit operates based on a DC bus voltage signal. The electric motor is configured to enter hibernation while the switch provides the rotor mechanical angle, wherein during the hibernation all current in the electric motor is lined up with the rotor mechanical angle.

In a second aspect, a drive unit includes: an electric motor; and means for selectively providing either a flux angle or a rotor mechanical angle for controlling the electric motor.

In a third aspect, a method includes: operating an electric motor, wherein a stator flux angle is a reference frame for a controller for the electric motor; based on a requested torque from the electric motor being zero and a q current of the electric motor being below a first threshold, setting a rotor mechanical angle as the reference frame instead of the stator flux angle; and based on the requested torque being nonzero and a flux of the electric motor being above a second threshold, setting the stator flux angle as the reference frame instead of the rotor mechanical angle.

Implementations can include any or all of the following features. The method further comprises hibernating the electric motor while the switch provides the rotor mechanical angle, wherein during the hibernation all current in the electric motor is lined up with the rotor mechanical angle. The method further comprises setting a hibernation inhibition to prevent hibernation of the electric motor, wherein the electric motor is hibernated while the switch provides the rotor mechanical angle only if the hibernation inhibition is removed. The method further comprises, in response to setting the rotor mechanical angle as the reference frame instead of the stator flux angle, setting to zero a d current reference for a d current regulator of the electric motor. Setting the d current reference to zero further comprises delinking a flux regulator from the d current regulator. The method further comprises evaluating, after setting the d current reference to zero, a current threshold as a condition for turning off an inverter of the electric motor. The method further comprises awaiting, after setting the d current reference to zero, a timer countdown as a condition for turning off an inverter of the electric motor. An inverter of the electric motor is turned off while the rotor mechanical angle is set as the reference frame, the method further comprising turning the inverter back on upon the requested torque being nonzero. The method further comprises also taking into account a flux threshold as a condition for setting the rotor mechanical angle as the reference. The method further comprises taking into account a flux threshold as a condition for setting the stator flux angle as the reference frame. The stator flux angle is provided by a flux estimator circuit, the method further comprising, before the flux threshold is met, seeding the flux estimator circuit with the rotor mechanical angle.

DETAILED DESCRIPTION

This document describes examples of operating an electric drive unit, such as an alternating current (AC) induction motor or a synchronous permanent magnet motor, in either a normal mode or a hibernation mode. Particularly, the motor can be configured so that it normally operates using a flux-oriented control scheme. This can involve an electric vehicle that is powered by one or more electric motors, for example. To reduce the loss of energy in the motor, it can be advantageous to hibernate the motor whenever no torque is immediately demanded from it, even for a brief moment or an instant. In an electric motor, when zero torque is to be produced, the magnetic flux must be synchronous with the rotor. Because the magnetic flux of the motor will reduce to zero during hibernation, the flux-oriented control scheme then becomes infeasible to use in controlling the motor. For example, the measurement of the flux angle in the motor becomes too inaccurate to be properly tracked and the control scheme loses flux orientation. Instead, various implementations described herein illustrate that the motor controller can then switch to a reference frame that is synchronous with the rotor of the motor. This allows robust and continuous motor operation also through periods when it is desired to have zero torque and flux levels below what can normally be detected with accuracy.

Figure 1:
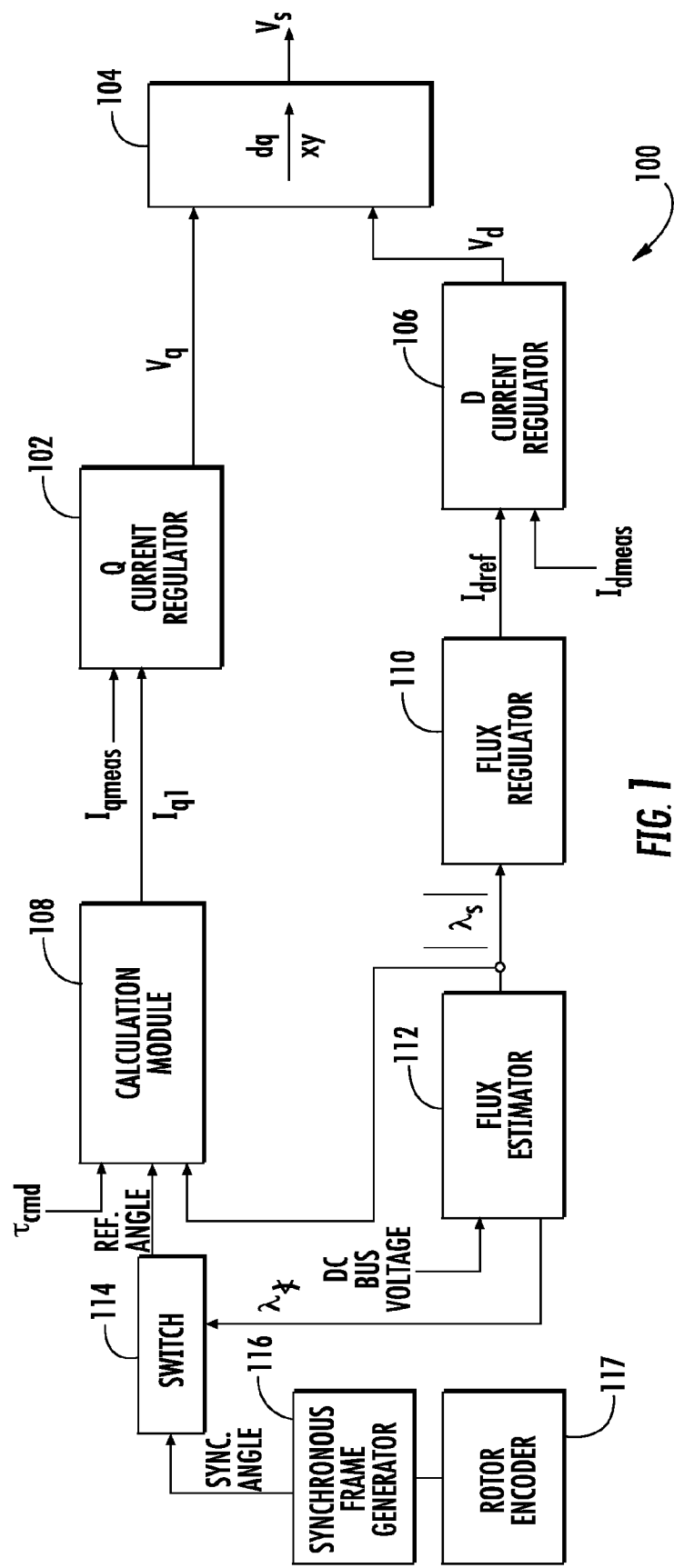
FIG. 1 shows an example of a motor controller for an AC induction motor.

FIG. 1 shows an example of a motor controller 100 for an electric motor, such as an AC induction motor, a synchronous reluctance motor, or a synchronous permanent magnet motor. Generally, the motor controller can be implemented in form of one or more circuits designed to control the motor during all aspects of its operation. For example, the operation of such circuits can be defined by execution of software and/or firmware. In some implementations, the motor is installed in an electric vehicle. For example, if the vehicle has more than one electric drive unit then each of them can be controlled using a corresponding controller.

The motor controller includes a q current regulator 102 that provides a vq value to a reference frame converter 104. The q current regulator can receive one or more inputs for its operation. Here, a measured q current (Iqmeas) and a reference q current (Iq1) are being input; that is, the q current regulator seeks to vary the vq so as to regulate the measured q current to match the reference q current. For example, one or more current sensors are implemented in the electric system to measure how much torque-producing current is being generated.

The reference frame converter 104 is labeled dq→xy, meaning that the conversion is between a rotating reference frame (dq) and a stationary reference frame (xy). As is known, use of the dq reference frame involves defining respective direct (d) and quadrature (q) currents that represent the individual currents of a three-phase power supply. The converter is configured to perform one or more transformations that are part of the conversion between reference frames. For clarification, it is here noted that this disclosure will describe that the motor controller can alternate between different reference frames for determining an angle of the flux vector, and that this is separate from the change between xy and dq reference frames performed in the converter 104.

The motor controller also includes a d current regulator 106 that provides a corresponding vd value to the converter 104. That is, the d current regulator seeks to vary vd so as to regulate the flux to match its corresponding reference. Based on vq and vd, the converter outputs a voltage vs as a signal for controlling the motor.

The reference q current, on the other hand, can be generated by a calculation module 108 that implements one or calculation algorithms. The calculation module takes as its input various signals, such as a torque command (τcmd) that reflects a requested torque from the drive unit, as well as a flux angle (λangle) and a flux magnitude (|λs|), both of which will be described below. For example, the torque command can reflect how much the driver is depressing an accelerator pedal in an electric vehicle. Additional inputs to the calculation module can include, but are not limited to, the available energy for the drive unit (e.g., corresponding to the state-of-charge of a battery pack or other energy storage system), and an operating characteristic of the motor (e.g., rotor speed and/or measured current).

The motor controller includes a flux regulator 110 that normally produces the d current reference for the d current regulator. In some implementations, the flux regulator can include a feedback mechanism or other regulator configured to stabilize or otherwise modulate or correct a difference between a measured value and a calculated value or a reference value. For example, the flux regulator here can receive the flux magnitude (|λs|) and a flux angle (λangle), both from a flux estimator 112. In some implementations, the first flux magnitude can be a reference for flux value that is calculated using some or all of a torque command value, an available energy signal, and at least one operating characteristic of the motor. Flux magnitude can be estimated in any of multiple ways, such as by multiplying d current with rotor inductance.

The flux estimator 112, in turn, is a component that estimates how much flux exists in the rotor of the motor. In some implementations, the estimator takes as its input a DC bus voltage signal from the energy storage system that powers the motor. The estimator can process that signal based on specific knowledge about the inverter (e.g., what switches were firing when) to arrive at an estimate of the flux. For example, the flux vector can be estimated in terms of its magnitude, as well as its angle with regard to a reference frame.

The flux estimator can provide the estimated flux magnitude to the calculation module, as noted. The estimated flux angle, on the other hand, is not provided directly to the calculation module. Rather, this estimated flux angle can be provided to a switch 114 that is coupled to the calculation module. In turn, the switch is also provided another angle from a synchronous frame generator 116 that comprises logic implemented in software or firmware. The synchronous frame generator receives input from a rotor encoder 117 that is coupled to the rotor of the AC induction motor. The rotor encoder tracks the mechanical rotation of the rotor; for example, the synchronous frame generator can apply a virtual mark to the rotor at any given time and thereafter trace the rotation of the rotor with reference to that arbitrary mark. Other devices for detecting rotor angle can be used instead of the rotor encoder, including, but not limited to, a resolver.

It was mentioned above that some or all of the motor controller can be implemented in form of software or firmware, and accordingly the switch 114 can comprise an instruction executable by a processor that defines whether the calculation module receives its angle from the flux estimator or from the rotor encoder. It will be described in examples below that such switching can serve to shift the motor control between different reference frames: a stator flux reference frame (when using the input from the flux estimator), suitable for normal operation (i.e., when applying torque), and a rotor reference frame synchronous with the rotor, suitable for zero-torque situations (e.g., when hibernating the drive unit).

In a synchronous machine, one must control the flux to not only be synchronous, it must line up with a particular angle on the rotor such that zero torque is produced. That is, if the q current is zero in such a machine, this means that the flux is lined up with that angle (defined by the positions of the magnets, or the shape of the rotor, for example).

Figure 2:
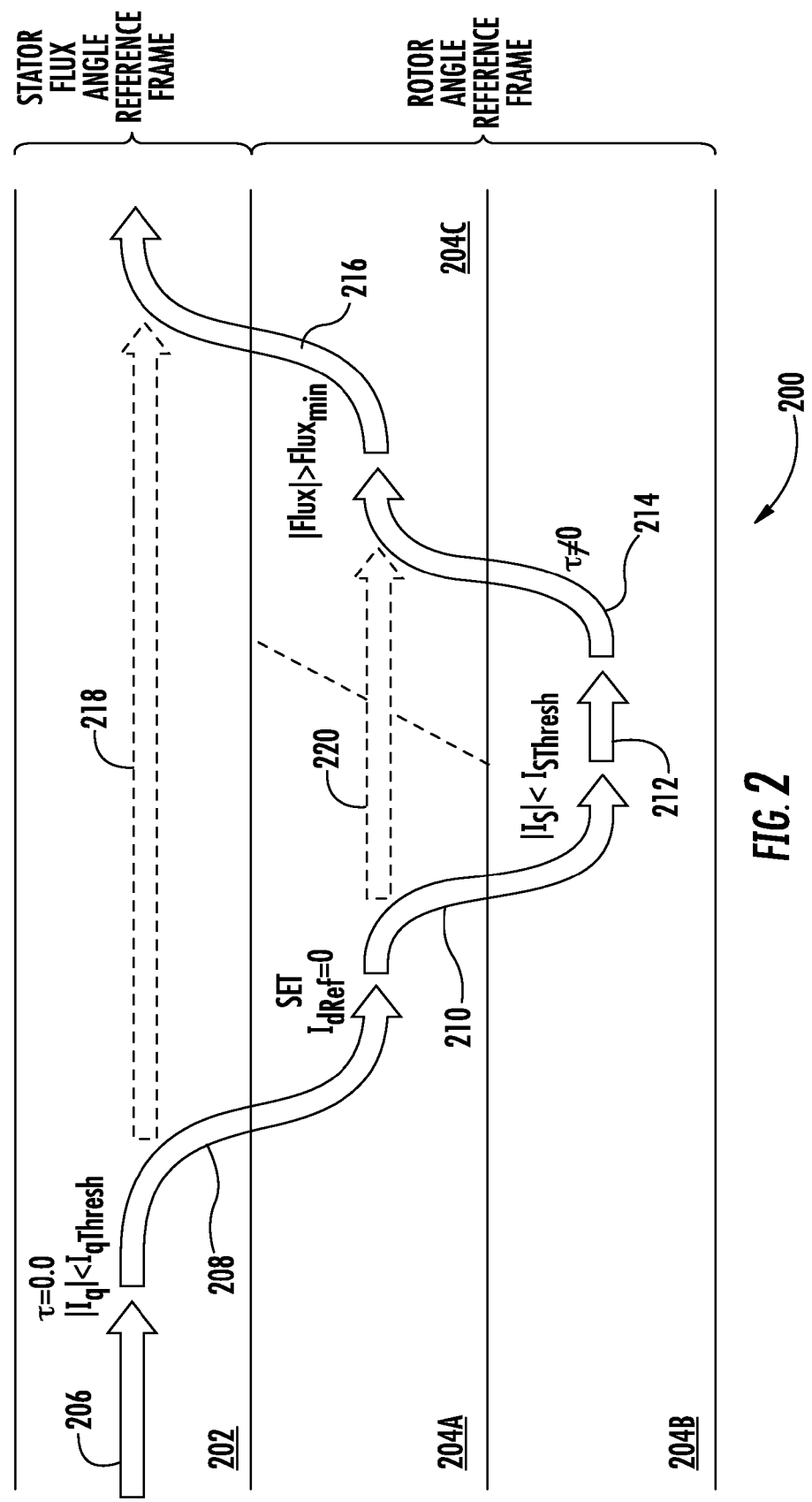
FIG. 2 conceptually shows an example of a normal mode and a hibernation mode for a drive unit.

FIG. 2 conceptually shows an example 200 of a normal mode 202 and a hibernation mode 204A-C for a drive unit. Horizontal lanes are here used to represent the respective modes, and the operation of the drive unit is indicated by arrows within and/or between the lanes. For example, an operation 206 takes place in the normal mode, meaning that a stator flux angle reference frame is being used for controlling the drive unit. For example, this corresponds to the switch 114 (FIG. 1) providing the reference angle (λangle) from the flux estimator, and not the synchronous angle from a rotor encoder, to the calculation unit. This reference frame is then used in defining, at each instant, the amounts of q and d currents that are present in the motor. For example, when the drive unit is implemented in an electric vehicle, operation in the normal mode takes place at least whenever torque is being requested from that drive unit (such as when accelerating or driving up a hill).

From time to time, however, it happens that zero torque is requested from the drive unit. For example, this can occur in a multi-motor vehicle when the torque delivered by one or more other drive units is sufficient to satisfy the total torque request. As another example, a zero torque request occurs when a (single-motor or multi-motor) electric vehicle comes to a stop, such as at a stoplight.

Zero torque being requested from the drive unit is one condition that must be satisfied before possibly transitioning into hibernation mode. One or more additional conditions can be applied. In some implementations, it can be required that the measured q current is at or near zero. For example, the magnitude of the q current can be compared to a q current threshold (Iqthresh). As another example of a condition, a flux threshold can be applied to ensure that the flux is sufficiently low before hibernation.

Here, operation 208 corresponds to the motor controller shifting from using a stator flux angle reference frame to a rotor angle reference frame. That is, this shift of reference frame signifies that the motor controller is no longer predicting the angle of flux in the rotor based on measured current as during normal operation, but rather has pinpointed the angle of the flux that is expected to be remaining in the rotor and is maintaining that angle fixed with reference to the rotor. This is sometimes referred to as a rotor mechanical angle. Moreover, while the drive unit is controlled with regard to the rotor angle reference frame, the only current in the stator that the motor controller allows is any current aligned with the encoded virtual mark on the rotor.

The drive unit enters the part of hibernation mode that is labeled 204A in response to an intent to hibernate the drive unit. That is, based on one or more circumstances (exemplified above), the motor controller has initiated the process that could subsequently cause a temporary shutdown of the corresponding inverter, thereby resulting in the AC induction motor being hibernated. In some implementations, the intent can be reflected by one or more bits. For example, a bit can be defined in the motor controller that signals, at every given moment, whether to initiate hibernation for that drive unit assuming that other conditions are met. In such implementations, the value of that bit is one of the conditions required for causing the motor controller to enter the mode 204A.

Upon entering the hibernation mode 204A, the reference for the d current is set to zero, thereby resulting in the total current being set to zero. Here, this corresponds to requesting the d current regulator 106 (FIG. 1) to stop requesting d current. In some implementations, setting the d current reference to zero involves delinking the flux regulator 110 (FIG. 1) from the d current regulator. For example, a switch can be implemented between these regulators so as to provide the d current regulator with either the output from the flux regulator, or with a fixed (zero) input. In terms of the hibernation intent mentioned above, setting the d current reference to zero in the hibernation mode 204A corresponds to a confirmation that the intent is still to bring the drive unit into hibernation.

Setting the d current reference to zero corresponds to an operation 210 where the drive unit is brought into hibernation mode 204B in which the inverter will actually be turned off, causing the drive unit to cease using electricity from the energy storage. In some implementations, one or more conditions must be met before turning off the inverter. For example, the motor controller can determine whether a magnitude of the stator current is zero or at most sufficiently low (e.g., below a threshold level). As another example, a timer countdown can be used to give the rotor flux sufficient time to settle down before inverter shutdown. In some implementations, the inverter is turned off by disabling a pulse width modulation signal that controls inverter operation.

Operation 212 corresponds to the drive unit actually being in hibernation. That is, the torque requested from the drive unit is zero, the q current is therefore zero, the d current is at zero. Flux could remain in the (spinning) rotor at this point; however, because the inverter has been turned off and has effectively become an open circuit, any voltage coming from the rotor (sometimes referred to as a back emf) is merely being applied to the inverter terminals. In short, although there is here flux in the rotor, there is nevertheless no stator current and no torque being produced.

Completely shutting down the inverter has at least two benefits. First, bringing the magnetic flux in the motor to zero reduces losses in the motor whenever it is spinning. Second, the ripple currents that flow in the inverter and motor when the inverter is active (even if it is creating a net zero fundamental current and therefore zero magnetic flux and zero torque) no longer occur. The latter eliminates standby losses that are otherwise incurred due to the switching in the inverter. As such, the advantage of increased range in an electric vehicle can be realized.

The operation 212 can continue for a time as short or long as necessary. One or more criteria can be evaluated to determine whether to turn the inverter back on. In some implementations, the motor controller will be triggered by a manifest intent to take the drive unit out of hibernation. For example, if the requested torque for the drive unit has become nonzero (that is, torque is now being requested), hibernation must end so that the drive unit can produce torque.

Operation 214 corresponds to the drive unit being taken out of hibernation and the inverter being turned back on. At this point, both the q current regulator and the d current regulator will be active in their standard way. In some implementations, the motor controller now again allows the d current regulator 106 (FIG. 1) to be controlled by the flux regulator 110, as opposed to having a zero d current reference set for it. For example, the flux regulator can be relinked to the d current regulator. Because there was presumably little or no flux in the rotor at this point, a substantial d current will be requested so as to build up flux in the machine. The flux regulator 110 can be running during the operations 212-214, given that its magnitude output is deemed trustworthy.

Because the inverter is again running and the flux regulator is requesting d current, the flux in the motor is expected to increase at a relatively fast rate. As mentioned, the flux estimator is continuously estimating the rising flux magnitude. However, it can be advantageous to wait until the flux increases to a sufficient magnitude before again placing reliance on the angle output of the flux estimator. This state of operation by the motor controller is here referred to as hibernation mode 204C. That is, the re-activation of the inverter signifies that the drive unit is exiting the hibernation mode 204B, but the transition initially takes it to the mode 204C where the rotor mechanical angle continues to be used as the reference frame while flux is ramping up.

The transition from the hibernation mode 204C back into the normal mode 202 can be controlled by one or more criteria. In some implementations, the magnitude of the flux, as reported by the flux estimator, is compared with a threshold value. For example, here operation 216 indicates that |Flux|>Fluxmin is true, and that the drive unit is again entering normal mode. That is, the mode 204C can involve placing the flux regulator back in charge of the d current reference, giving the flux regulator a flux target of normal minimum flux, waiting for it to accomplish that target, and thereafter transitioning back into normal mode.

Because the angle of the flux estimator may or may not be trustworthy, upon transition to mode 202 the flux angle can be overwritten with the value based on the reference frame synchronous with the rotor. That is, upon hibernation being ended the motor controller can seed the flux estimator with an initial value that in a sense is the system's best available information as to what the flux is. The flux estimator performs estimation based on this flux value.

The above transition involves changing the reference frame from a rotor mechanical angle to the flux angle generated by the flux estimator. The drive unit can then continue to operate in normal mode for an arbitrary amount of time until the circumstances dictate otherwise, for example if the vehicle is brought to a stop or if it again enters hibernation mode, in which case the above procedure is essentially performed again.

On the other hand, if the circumstances should change while in the mode 204C, the motor controller can again enter the hibernation mode 204A, and from there possibly into mode 204B according to those conditions, without first reentering the normal mode. As noted earlier, the mode 204A involves setting the d current reference to zero to allow the drive unit to ultimately enter the mode 204B so that the inverter is again turned off.

With continued reference to the example 200, and in contrast to the above scenario, some situations will now be described that do not involve turning off the inverter. First, an operation 218 conceptually illustrates that the vehicle continues to operate in normal mode. For example, if at least one criterion for hibernation is not satisfied, this corresponds to the absence of an intent to hibernate the motor. Another example, however, is that a hibernation inhibition can be defined for the drive unit. Such inhibition can be effectuated by setting a flag in the motor controller that prevents the drive unit from entering hibernation also when the conditions therefor are present. As such, in those cases the drive unit will not transition into hibernation until after the hibernation inhibition has been removed.

Second, an operation 220 illustrates a scenario where an intent to hibernate initially exists, but where the circumstances change before the inverter is actually turned off. That is, the drive unit transitions from the normal mode to the hibernation mode 204A because the criteria for hibernation are satisfied. Accordingly, the motor controller instead begins using the rotor angle reference frame, as described earlier. However, assume now that the requested torque, which was previously at zero and therefore triggered the transition, instead rises to a nonzero value. In other words, the condition for hibernating the drive unit does not exist and there is no longer any intent to hibernate. As a result, the controller immediately transitions to the mode 204C, in which the flux regulator will begin to request d current in order to build up flux in the motor, and the d current regulator will therefore start to increase the d current. This example illustrates an advantage of using a reference frame synchronous with the rotor: by keeping track of where the residual flux is in the rotor, one facilitates a smoother transition when the hibernation is suddenly called off.

The operation 220 illustrates this change in the motor controller by transitioning from the mode 204A directly to the mode 204C without entering the mode 204B. That is, both of the modes 204A and C involve using the rotor mechanical angle reference frame, but it is only in the latter that flux is being regulated upward. The drive unit can then transition back into normal mode by the operation 216.

Figure 3:
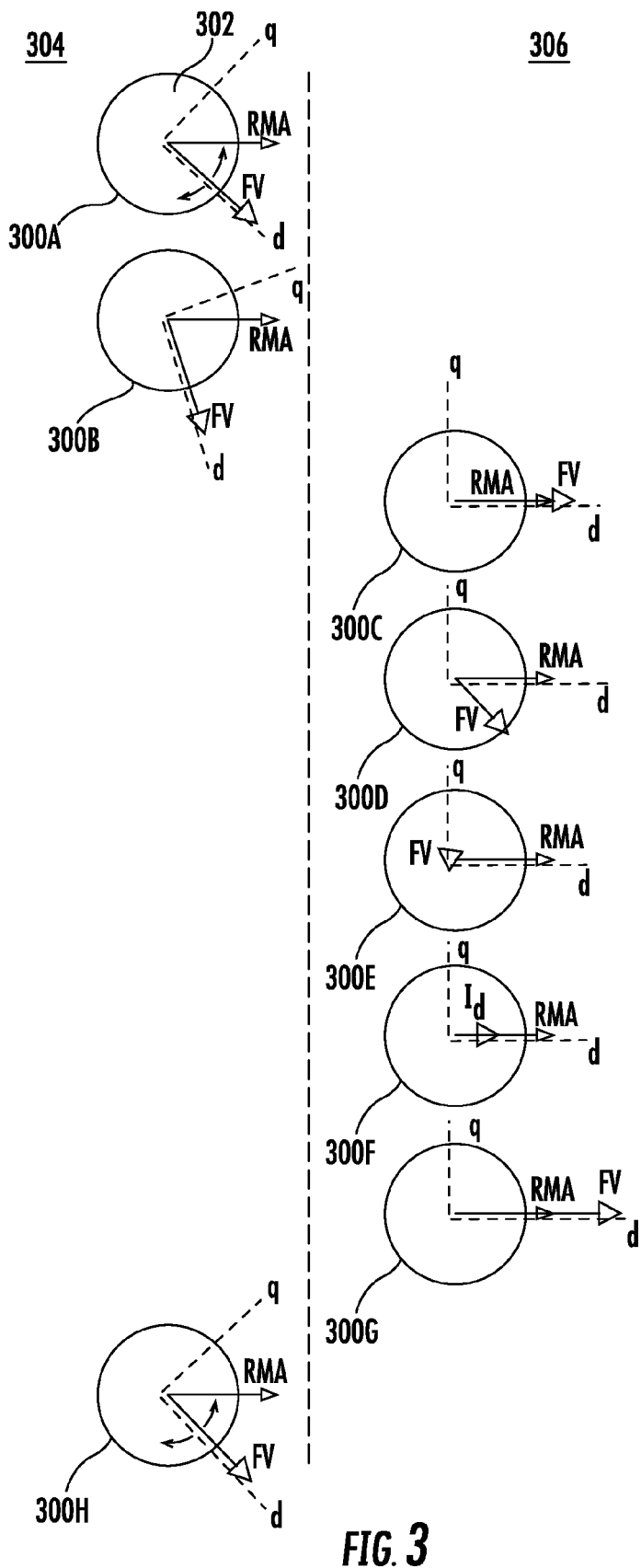
FIG. 3 shows examples of vector diagrams for an AC induction motor.

FIG. 3 shows examples of vector diagrams 300A-H for an AC induction motor. Each of the diagrams shows a rotor 302 of the AC induction motor, whereas the stator is not shown here for simplicity. The example illustrates a motor that transitions from normal mode into hibernation mode and thereafter back into normal mode. The vector diagrams are here arranged according to which reference frame the motor controller uses for the flux: a region 304 corresponds to a stator flux reference frame and a region 306 to a rotor mechanical angle reference frame.

The diagram 300A shows a vector (RMA) representing a rotor mechanical angle. The RMA is here fixed relative to the rotor itself. For example, an arbitrary point on the rotor has been selected, such as by applying a virtual mark using an synchronous frame generator, and the RMA is then defined to line up with that mark. Presently, the motor is producing torque and therefore a flux vector (FV) defined in the diagram is slipping (i.e., rotating) relative to the RMA. That is, with regard to the RMA the FV appears to be rotating in either direction, as here indicated by small arrows; the greater the torque is, the faster the FV will be spinning. Also shown are axes for the q and d currents, Iq and Id, respectively. The d axis is aligned with the FV and these axes therefore also orbit relative to the RMA.

The diagram 300B corresponds to a situation where zero torque is being requested from the AC induction motor. Here, this corresponds to the FV stopping and instead remaining fixed relative to the RMA. Because the RMA was arbitrarily chosen to begin with, the FV can end up stopping anywhere relative to the RMA.

So far, the moving FV was used as the reference frame, meaning that all current reference vectors were measured relative to it. Once the flux vector has stopped, however, the motor controller is ready to switch into the other reference frame.

In the diagram 300C, the RMA is then redefined to be aligned with the stopped FV, which is the only difference compared to the diagram 300B. For example, the previous virtual mark on the rotor is erased and a new mark is instead placed where the FV is. This is the RMA that the motor controller will use throughout this example. The diagram 300C illustrates two things. First, the diagram is in the region 306, indicating that the rotor angle reference system is now being used. Second, the FV and the RMA are now aligned, due to the reference frame having been recreated. Because the FV has stopped, the q and d axes also remain fixed relative to the RMA.

The diagram 300D shows that the actual measured flux can start to change relative to the RMA. Namely, as the motor controller is bringing flux down, the estimate of what the FV is doing could become inaccurate. The estimated magnitude of the FV can remain reasonably accurate past this point, but in at least some implementations the flux magnitude is mostly irrelevant to the system under those circumstances. For example, it is possible that the flux regulator 110 (FIG. 1), which is a component that receives a flux magnitude input, is not being used on the way down towards zero flux. Rather, the flux magnitude is more important when flux is being regulated up. Accordingly, the FV can begin to drift and start moving around relative to the RMA without affecting the controller's maintenance of zero torque.

Further, once the FV becomes small enough, the concept of the angle of the FV relative to the RMA becomes lost in the noise. The diagram 300E shows the FV having a length close to zero and pointing in a certain direction. As noted, even a minuscule change in the flux at this point could cause the estimated direction to change significantly, say by flipping 180 degrees. This illustrates the need to instead rely on something that provides a more robust estimation of the flux angle, and here the RMA is being used for this purpose. The motor controller shuts off the inverter in either of the conditions shown in the diagrams 300D and 300E. The only difference between the two is that the flux vector has become smaller. In some implementations, shutting off the inverter corresponds to the AC induction motor entering the hibernation mode 204B (FIG. 2). As noted, turning off the inverter does not eliminate all voltage; rather, a back emf can remain but is expected to fade over time.

With reference now to diagram 300F, assume that torque is again being requested and that the AC induction motor should therefore be brought out of hibernation. On the way back up, the motor controller keeps q current at zero but allows the flux regulator 110 (FIG. 1) to increase d current. In other words, the only current being applied is along the d axis, which as noted has been aligned with the RMA by way of definition.

Ramping up current in the motor will consequently increase flux, and because all of the current at this point occurs along the d axis, the flux vector will line up with that axis as well. The diagram 300G shows the FV aligned with the d axis and with the RMA. That is, the d axis is where the flux presently is, and because of the chosen frame of reference (i.e., one fixed to the rotor), the motor controller has known the flux direction throughout the process.

The flux estimator, moreover, will eventually come to agree with where the estimated flux vector is once the vector becomes large enough. In some implementations, the ability of the flux estimator to eventually arrive at the correct prediction is sufficiently robust that the motor controller need not check whether there is any angle difference between the d axis and the estimated flux vector. This moment, then, is when it is appropriate to change back to the other reference frame.

The diagram 300H shows that the system is now back in a situation where torque is being produced, and where the FV therefore spins in either direction relative to the RMA. That is, the FV coming out of the flux estimator is now again reliable, both as to its magnitude and angle, and is being used as the reference frame. Moreover, the respective reference frames corresponding to the regions 304 and 306 agreed with each other at the very moment of transition: it is only when torque is being applied that the FV begins to slip relative to the RMA.

The above example described with reference to FIG. 3 pertains to an AC induction motor. Other implementations can involve different types of motors, however. For example, in synchronous electric motors, there is a particular angle on the rotor which when aligned with the flux vector results in zero torque, and that angle would be represented by RMA in the present illustrations. In a synchronous motor the torque is not produced by slip, but instead by an angular offset between the FV and the RMA. In the diagram 300B, to produce zero torque the FV must then have lined up with the RMA, and one would not necessarily need to redefine the RMA, as is done in the induction motor case.

Implementations can be put to use in different contexts. One of these is in an electric vehicle powered by one or more electric motors. An electric vehicle with dual electric motors can have two motors of essentially identical design, or it can have two electric motors of different types.

The vehicle can be configured so that only one of the drive units, or both, has the ability to change between reference frames for estimating flux. For example, a general motor control code can be developed so as to work with any of multiple types of drive units, and either of these motor types can therefore change reference frame as needed. One advantage of a dual motor vehicle is the ability to very precisely tailor—at a rate of once per millisecond or faster—the exact blending rate between outputs of the respective motors. In some implementations, these allocations are determined by referring to a map that assigns different torque splits between the drive units based on multiple characteristics.

If two different motor types are used in the vehicle, they can have different efficiency and performance characteristics, particularly when viewed across a range of vehicle speeds and torque levels. One of the drive units may be more powerful than the other, but in return have somewhat less efficiency, for example. The energy consumed by such a motor when it is producing no torque is larger than what the other drive unit would consume while at zero torque. Energy loss can therefore be reduced by providing at least the more powerful drive unit with a hibernation mode. This means that when the more powerful motor's torque request—as defined by an allocation of the total requested torque between the two drive units—is zero, then that motor can temporarily be placed in hibernation mode, thus eliminating energy loss that would otherwise occur even while producing zero torque. While the vehicle is cruising at a constant speed, say on the highway, the more powerful motor can be turned off whenever no torque is requested from it, and can just as quickly be brought back into operation when needed.

In other scenarios, however, it can be more advantageous from an energy standpoint to hibernate the other, smaller, drive unit. For example, in a situation where the total requested torque is moderately high while the vehicle is driving at lower speed, the torque allocation map can indicate that the best solution is to allocate all torque to come from the more powerful of the two drive units. Accordingly, at that point the smaller motor can then be hibernated for a shorter or longer time. Any situation where the lookup map assigns zero torque to one of the drive units is a candidate for having that motor enter hibernation mode.

Yet another example of where a change between reference frames can be used is when the motor is first awoken, such as when being placed into drive mode after having been parked. In some existing electric vehicles, the shift into drive mode triggers the motor controller to start fluxing up the drive unit(s). One reason for this design may have been that the flux-up process took a certain time: if that process were initiated only when the driver moved his or her foot onto the accelerator, then a noticeable delay could occur. The present technique of ramping up flux, on the other hand, can be significantly faster because it involves selecting a point on the rotor, awaiting a request for torque, and when that request arrives ramping up d current lined up with that point until the flux is above a certain threshold, after which the drive unit is allowed to transition to normal mode and apply torque. As such, some implementations can apply these techniques also when shifting into drive mode.

A number of implementations have been described as examples. Nevertheless, other implementations are covered by the following claims.

What is claimed is:

1. A drive unit comprising:
   an electric motor;
   a flux estimator configured to estimate at least a flux angle;

a synchronous frame generator coupled to a rotor of the electric motor and configured to detect a rotor mechanical angle;

a switch configured to selectively provide either the flux angle or the rotor mechanical angle for controlling the electric motor, a motor control that uses a torque request, a q current regulator, wherein the switch is configured to provide, based on a torque request and a q current being below a threshold, the rotor mechanical angle for controlling the electric motor; and a d current regulator, wherein a d current reference for the d current regulator is set based on switching to the rotor mechanical angle for controlling the electric motor.

2. The drive unit of claim 1, wherein the torque request is zero.

3. The drive unit of claim 2, wherein the d current reference for the d current regulator is set to zero.

4. The drive unit of claim 3, further comprising a flux regulator linked to the d current regulator, wherein the flux regulator is delinked from the d current regulator based on switching to the rotor mechanical angle for controlling the electric motor.

5. The drive unit of claim 1, wherein the flux estimator circuit operates based on a DC bus voltage signal.

6. The drive unit of claim 1, wherein the electric motor is configured to enter hibernation while the switch provides the rotor mechanical angle, wherein during the hibernation all current in the electric motor is lined up with the rotor mechanical angle.

7. A drive unit comprising:

an electric motor;

means for selectively providing either a flux angle or a rotor mechanical angle for controlling the electric motor;

means for setting a rotor mechanical angle as a reference frame instead of a stator flux angle based on a first requested torque and a flux of the electric motor being above a first threshold;

means for setting the stator flux angle as the reference frame instead of the rotor mechanical angle based on a second requested torque from the electric motor and a q current of the electric motor being below a second threshold; and means for setting a d current reference for a d current regulator of the electric motor in response to setting the rotor mechanical angle as the reference frame.

8. A method comprising:

operating an electric motor, wherein a stator flux angle is a reference frame for a controller for the electric motor;

based on a requested torque from the electric motor being below a third threshold and a q current of the electric motor being below a first threshold, setting a rotor mechanical angle as the reference frame instead of the stator flux angle;

based on the requested torque being above a fourth threshold and a flux of the electric motor being above a second threshold, setting the stator flux angle as the reference frame instead of the rotor mechanical angle; and in response to setting the rotor mechanical angle as the reference frame instead of the stator flux angle, setting a d current reference for a d current regulator of the electric motor.

9. The method of claim 8, further comprising hibernating the electric motor while the switch provides the rotor mechanical angle, wherein during the hibernation all current in the electric motor is lined up with the rotor mechanical angle.

10. The method of claim 9, further comprising setting a hibernation inhibition to prevent hibernation of the electric motor, wherein the electric motor is hibernated while the switch provides the rotor mechanical angle only if the hibernation inhibition is removed.

11. The method of claim 8, wherein the d current reference is set to zero.

12. The method of claim 11, wherein setting the d current reference to zero further comprises delinking a flux regulator from the d current regulator.

13. The method of claim 11, further comprising evaluating, after setting the d current reference to zero, a current threshold as a condition for turning off an inverter of the electric motor.

14. The method of claim 11, further comprising awaiting, after setting the d current reference to zero, a timer countdown as a condition for turning off an inverter of the electric motor.

15. The method of claim 8, wherein an inverter of the electric motor is turned off while the rotor mechanical angle is set as the reference frame, the method further comprising turning the inverter back on upon the requested torque being nonzero.

16. The method of claim 8, further comprising also taking into account a flux threshold as a condition for setting the rotor mechanical angle as the reference.

17. The method of claim 8, further comprising taking into account a flux threshold as a condition for setting the stator flux angle as the reference frame.

18. The method of claim 17, wherein the stator flux angle is provided by a flux estimator circuit, the method further comprising, before the flux threshold is met, seeding the flux estimator circuit with the rotor mechanical angle.

* * * * *